(12) United States Patent
Chong

(10) Patent No.: US 8,057,159 B2
(45) Date of Patent: Nov. 15, 2011

(54) TWIN WIND TURBINE POWER SYSTEM

(76) Inventor: Wun C. Chong, Delta (CA)

( * ) Notice: Subject to any disclaimer, the term of this patent is extended or adjusted under 35 U.S.C. 154(b) by 973 days.

(21) Appl. No.: 12/015,678

(22) Filed: Jan. 17, 2008

(65) Prior Publication Data

US 2009/0184521 A1    Jul. 23, 2009

(51) Int. Cl.
*F03D 7/06* (2006.01)
(52) U.S. Cl. .......................... 415/4.2; 416/88
(58) Field of Classification Search ............... 415/2.1, 415/4.1, 4.2, 4.3, 4.4, 60, 905, 907; 416/23, 416/87, 88, 122, 236 R
See application file for complete search history.

(56) References Cited

U.S. PATENT DOCUMENTS

| | | | | |
|---|---|---|---|---|
| 2,335,817 A * | 11/1943 | Topalov | ............ | 415/4.4 |
| 4,037,983 A * | 7/1977 | Poeta | ............ | 415/4.2 |
| 4,156,580 A | 5/1979 | Pohl | | |
| 4,729,716 A * | 3/1988 | Schmidt | ............ | 416/10 |
| 4,850,792 A * | 7/1989 | Yeoman | ............ | 415/4.2 |
| 6,015,258 A | 1/2000 | Taylor | | |
| 6,942,454 B2 * | 9/2005 | Ohlmann | ............ | 416/11 |
| 6,979,170 B2 * | 12/2005 | Dery et al. | ............ | 415/4.2 |
| 7,230,348 B2 * | 6/2007 | Poole | ............ | 290/55 |
| 7,287,954 B2 * | 10/2007 | Kinkaid et al. | ............ | 415/4.2 |
| 7,828,523 B2 * | 11/2010 | Bonnet | ............ | 416/1 |
| 2003/0032343 A1 * | 2/2003 | Garcia | ............ | 440/8 |

* cited by examiner

*Primary Examiner* — Nathan Wiehe
*Assistant Examiner* — Andrew C Knopp
(74) *Attorney, Agent, or Firm* — Oyen Wiggs Green & Mutala LLP

(57) ABSTRACT

This invention relates to a novel twin wind turbine power system. More particularly, this invention pertains to a twin wind turbine power system which has adjustable width blades, adjustable width wind deflectors and a telescoping erection capability. A twin wind turbine electrical power generating system comprising: (a) a first rotatable wind turbine with vertical radially extending blades around its axis; (b) a second rotatable wind turbine deployed parallel to the first turbine with vertical radially extending blades around its axis; (c) a vertical windshield positioned windwardly between the first and second wind turbines; (d) a wind direction member associated with the first and second wind turbines and directing the first and second wind turbines and windshield to face windward; (e) a rotational support upon which items (a), (b), (c) and (d) are mounted; (f) an alternator connected to the first and second wind turbines and generating electricity as the first and second wind turbines rotate.

20 Claims, 15 Drawing Sheets

SECTION B-B

SECTION D-D

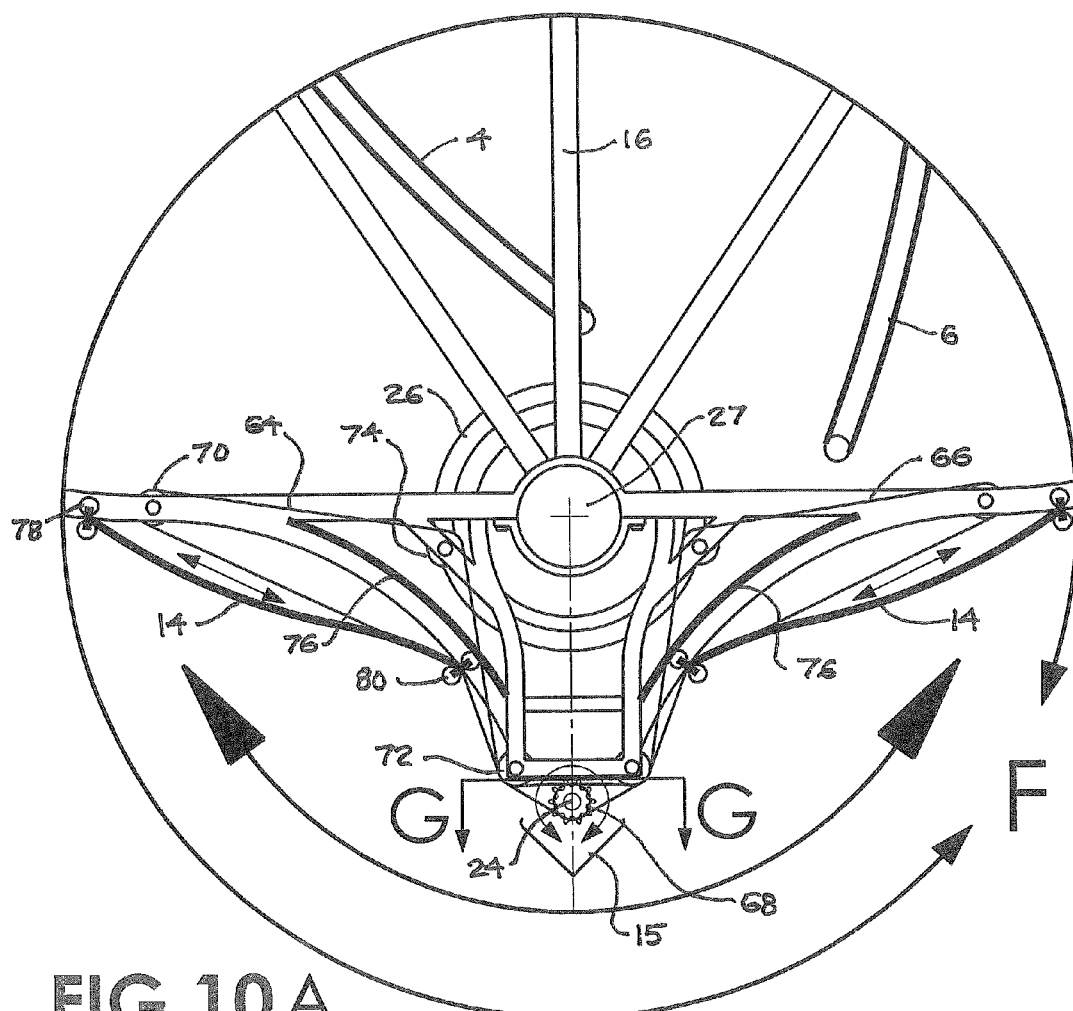
FIG 10A
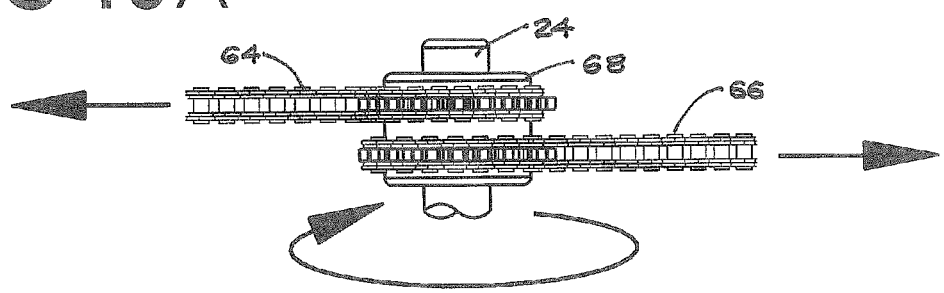
SECTION G-G    FIG 10B

TWIN WIND TURBINE POWER SYSTEM

FIELD OF THE INVENTION

This invention relates to a novel twin wind turbine power system. More particularly, this invention pertains to a twin wind turbine power system which has adjustable width blades, adjustable width wind deflectors and a telescoping erection capability.

BACKGROUND

With the depletion of hydrocarbon fuels and increasing emphasis on environmental impact, alternative sources of energy have been sought. One source of alternative electrical energy is wind machines. Such wind machines have a number of disadvantages. To erect such wind machines, it is necessary to use cranes. Moreover, the rotating blades of the wind machines create significant air turbulence. For instance, although wind turbines typically rotate at only 30-50 rpm, the tips of the blades, because of the extensive length of the blades, for instance, 100-200 ft., travel at subsonic, sonic and supersonic speeds. This creates sonic air vibrations. Persons living proximate to the wind machines are aggravated by the constant noise created by the air turbulence.

The foregoing examples of the related art and limitations related thereto are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The invention is directed to a twin wind turbine electrical power generating system comprising: (a) a first rotatable wind turbine with vertical radially extending blades around its axis; (b) a second rotatable wind turbine deployed parallel to the first turbine with vertical radially extending blades around its axis; (c) a vertical windshield positioned windwardly between the first and second wind turbines; (d) a wind direction member associated with the first and second wind turbines and directing the first and second wind turbines and windshield to face windward; (e) a rotational support upon which items (a), (b), (c) and (d) are mounted; (f) an alternator connected to the first and second wind turbines and generating electricity as the first and second wind turbines rotate.

The widths of the blades of the first and second wind turbines can be narrowed or widened to accommodate variable wind speeds. The width of the windshield can be narrowed or widened according to variable wind speeds.

The support for the first and second wind turbines can comprise a rotational shaft and a rotational member which rotationally rests on a stationary chamber which houses the alternator and associated electrical wiring.

The first and second wind turbines can be connected to the alternator by a system of sprockets, connecting chains and timing gears. The width of the windshield can be controlled by a connecting shaft and servomotor. The system can include wind directional vanes located on each lateral exterior side of the first and second wind turbines. The rotational shaft for the first and second wind turbine can be a telescoping shaft.

The first and second wind turbines can be constructed of modular sections which can be assembled separately. The windshield can be constructed of stationary and movable sections. The movable section of the windshield can be controlled by a system of sprockets and chains controlled by the servomotor.

The axes of the first and second wind turbines can be vertically disposed axles which can be connected separately by pulley, sprocket timing gears and chain combinations to the alternator. The system can include a brake which upon command can apply a braking force to the pulley sprocket, chain system and timing gears.

The turbine blades can be formed of stationary and movable vanes which cooperate together to increase or decrease the width of the turbine blade. The movable vane can be connected to a spring wherein the position of the movable vane resists the force exerted by the spring according to the centrifugal force generated by a rotating wind turbine. The stationary and movable vanes on the windward side can have a series of downwardly angled parallel grooves therein which deflect the wind downwardly, thereby imparting a lifting force on the first and second wind turbines.

The leeward side of the system can have one or more downwardly disposed wind vanes which can deflect leeward wind downwardly and thereby impart a lifting force on the first and second wind turbines. The chamber can be cylindrical in construction and the movable member can be a plate which can be rotationally mounted on the top of the cylindrical chamber by a series of wheels.

The first and second wind turbines and the windshield can be mounted in a supporting frame. The blades of the first and second turbines can intersect and the positions of the first and second wind turbines can be controlled by timing gears.

The system can include at least one deflector which can direct wind downwardly and lighten the weight of the turbine system.

The stationary and movable vanes can be secured at one end and can flare from the turbine blades when on the leeward side of the blades.

The system can include a wind deflector on the windward side of the windshield. The brake can be a disk brake.

The movable vanes can pivot away from the turbine blades when the movable vanes are on the leeward side of the turbine blades.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 10A illustrates an enlarged view of the section illustrated by circled portion F of FIG. 8.

FIG. 10B illustrates a section view taken along section G-G of FIG. 10.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
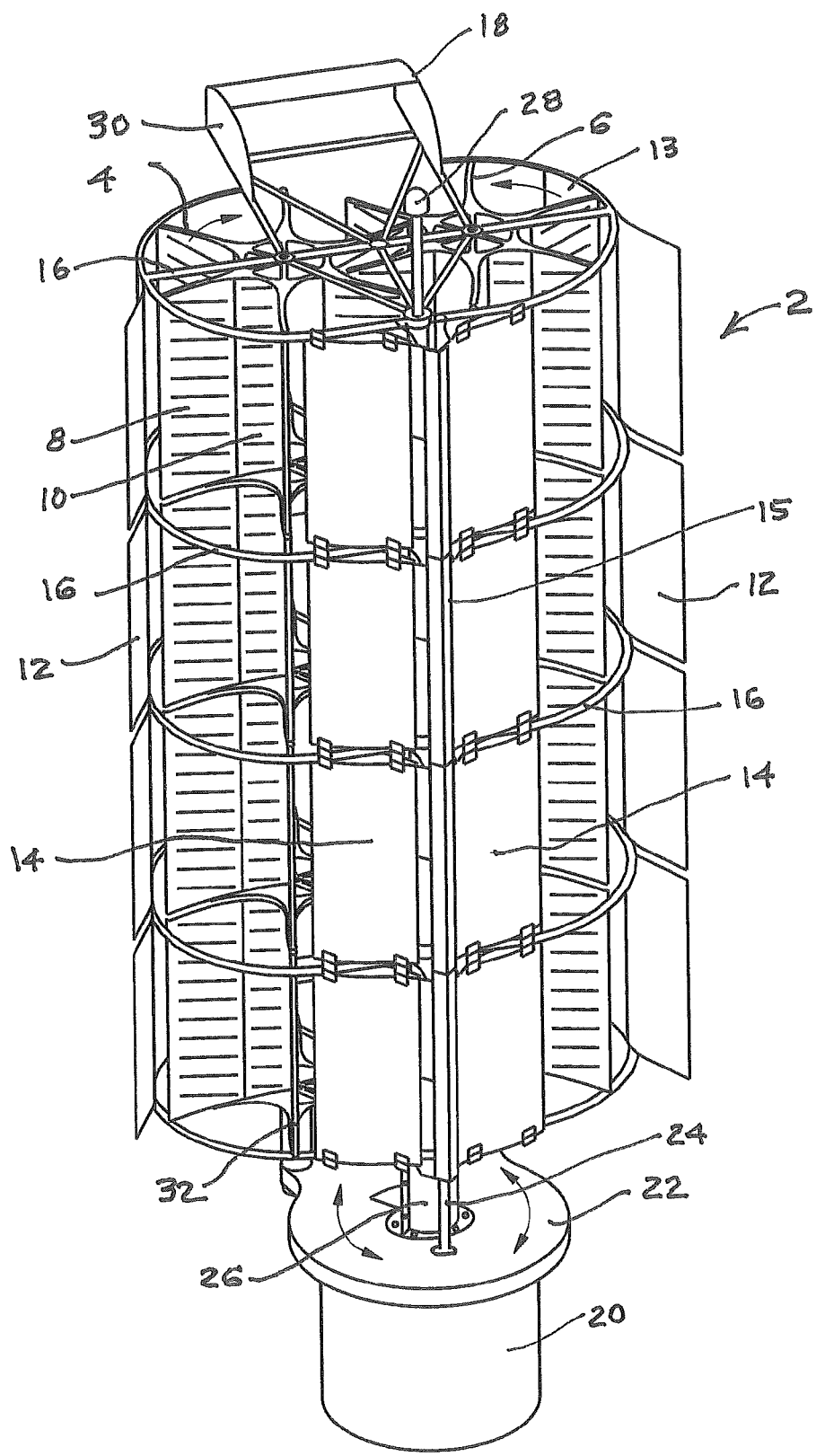
FIG. 1 illustrates an isometric view of the twin wind turbine power system.

FIG. 1 illustrates an isometric view of the twin wind turbine power system 2. As illustrated in FIG. 1, the twin wind turbine power system 2 is constructed of a first (left) vertical turbine 4 and a parallel vertical second (right) turbine 6. The first turbine 4 is constructed with a radial series of stationary vanes 8 and movable vanes 10.

The second turbine 6 has a similar construction. A typical embodiment comprises six radial blades per turbine. The wind exposed portion of each blade is curved windwardly (see FIG. 4).

The stationary vanes 8 and movable vanes 10 together make up the turbine blades. The blades of the first turbine 4 and second turbine 6 intersect to a certain degree (for instance, see FIG. 4) in order to reduce the overall width of the twin wind turbine power system without reducing wind catching efficiency. The intersecting positions of the first turbine 4 and second turbine 6 are coordinated by intersecting timing gears, as will be explained below.

A pair of wind catchers 12 are located on the respective exterior sides of the first and second turbines 4 and 6. These wind catchers 12 increase the effective "wind width" of the twin wind turbine power system, as illustrated by the hollow head arrows in FIG. 8, which will be discussed below.

Figure 8:
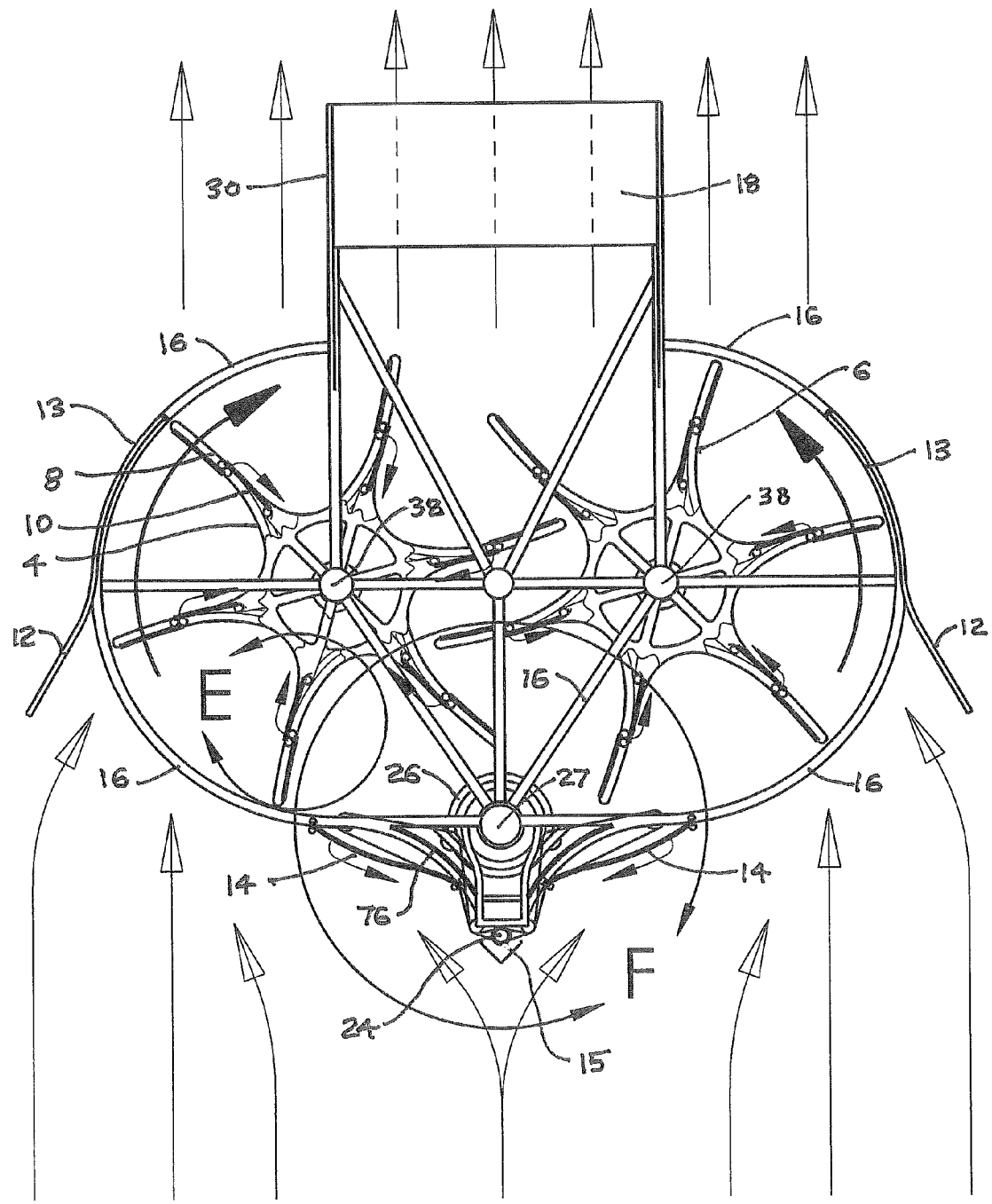
FIG. 8 illustrates a top view of the twin wind turbine power system.

Located at the front, windward side of the twin wind turbine power system 2 are matching adjustable width vertical windshields 14 which are positioned on each side of a vertical V-shaped central wind deflector 15. The pair of windshields 14 and deflector 15 prevent the wind from entering the central area of the parallel vertical twin wind turbines 4 and 6 and deflect that wind to the exterior blades (vanes 8 and 10) of the pair of wind turbines, as indicated in FIG. 8, which will be discussed below.

As seen in FIG. 1, the twin wind turbines 4 and 6, constructed of vertically disposed turbine sections comprising stationary vanes 8 and movable vanes 10, are supported on respective turbine shafts 38 (see FIG. 4) and held in place and reinforced by a cage-like support frame 16. Four vertical turbine sections are illustrated in FIG. 1. However, it is understood that the elevation of the twin wind turbine power system is adjustable and the number of sections can comprise anywhere from one to a significant number of twin wind turbine sections.

A wind direction vane 18 is located at the top of the twin wind turbine 2. This wind vane 18 reacts to wind direction and ensures that the front face of the twin wind turbines 4 and 6 and windshields 14 face windward.

Figure 3:
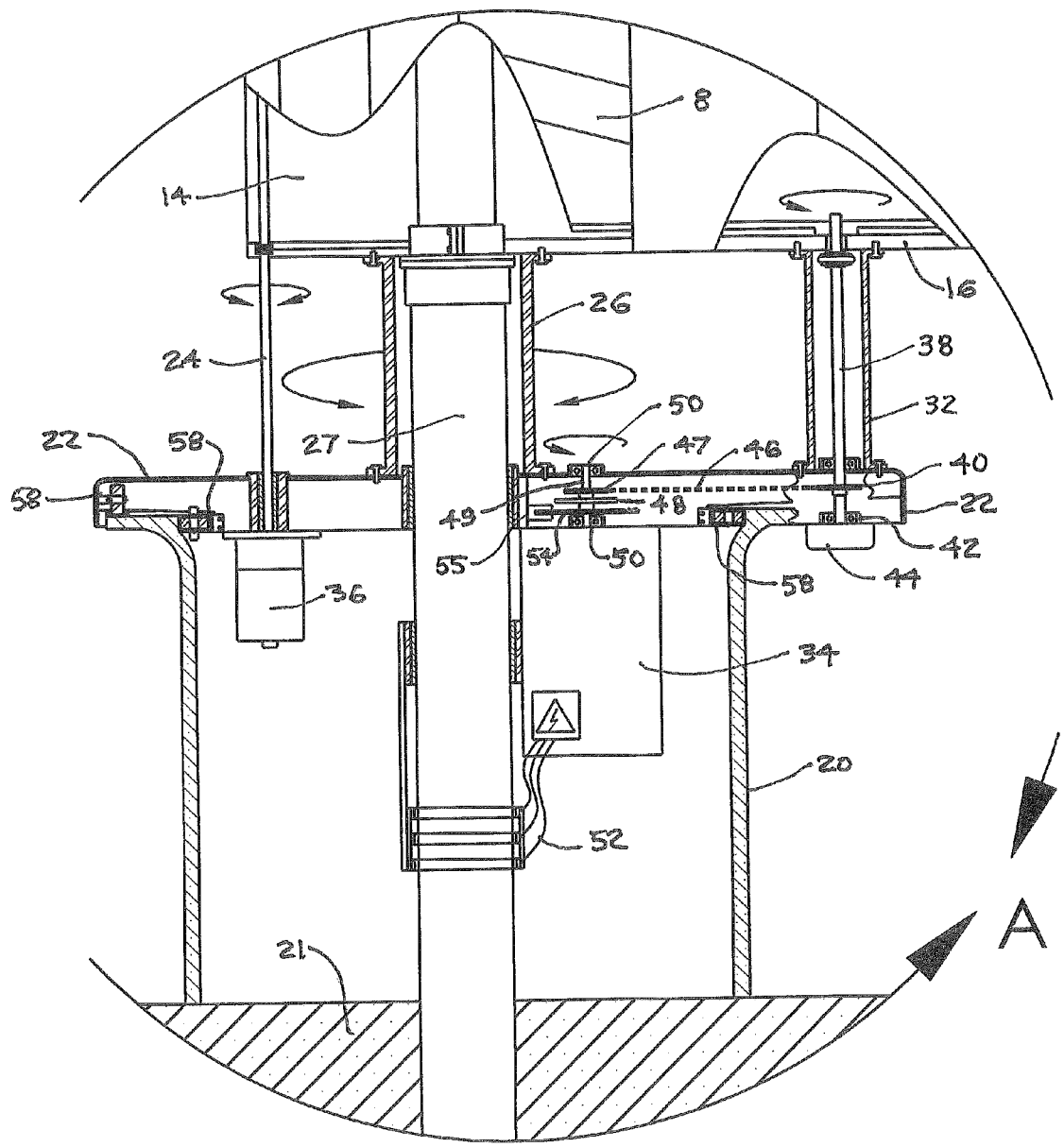
FIG. 3 illustrates an enlargement of the section illustrated by the circled portion of FIG. 2.

Located at the bottom of the twin wind turbine system 2 is an electrical room 20 which has a cylindrical configuration. Electrical room 20 is hollow and stationary and is supported on a solid foundation 21, for example, concrete as indicated in FIG. 3.

Rotatably mounted at the top of the cylindrical electrical room 20 is a rotatable plate 22. This rotation is indicated by the arrows in FIG. 1. Positioned in the center of rotatable plate 22 is a vertical twin turbine support shaft cover 26. Mounted in vertical parallel configuration to support shaft cover 26 is windshield control shaft 24 (see FIG. 8). A warning light 28 for aircraft is located at the top of the twin wind turbine system 2.

While the applicant does not wish to be bound or restricted by any specific dimensions, a typical twin wind turbine system 2 according to the invention can be 100 feet in overall height and 40 feet in width. The electrical room 20 and rotatable plate 22 can be 20 feet in height, while the respective stacked sections of the twin wind turbine system 2 can each be 20 feet in height. It will be understood that other dimensions of twin wind turbines can be engineered and put into practice.

Figure 2:
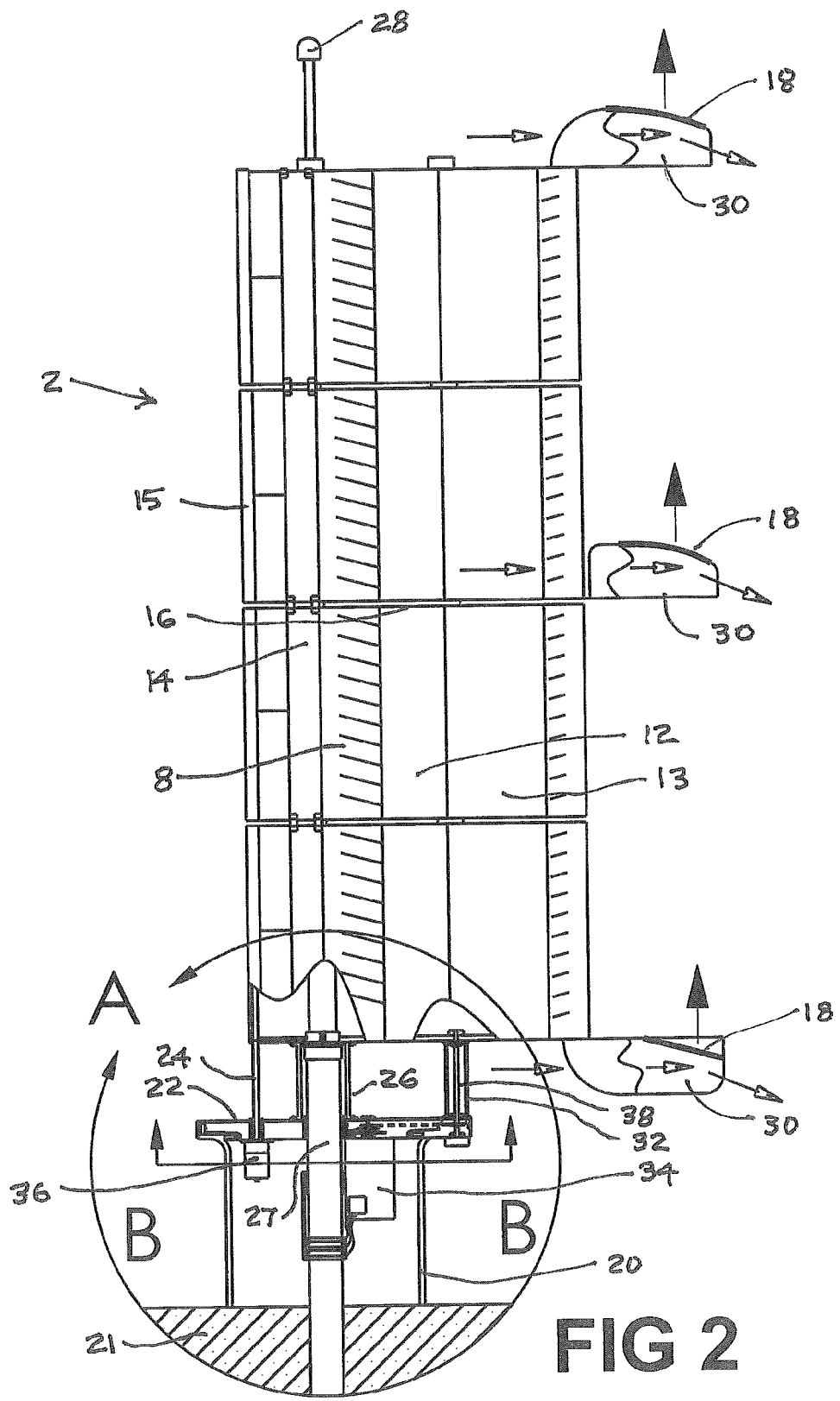
FIG. 2 illustrates a side view of the twin wind turbine power system.

FIG. 2 illustrates a side view of the twin wind turbine power system 2. As seen in FIG. 2, the twin wind turbine system 2 comprises stationary vanes 8 (the movable vanes 10 are not visible), wind catchers 12, curved wind retaining wall 13, windshields 14, V-shaped wind deflector 15 and support frame 16. Mounted at the leeward side of the twin wind turbine system 2 are three vertically arranged load lifters 18. These load lifters 18, by being curved downwardly, deflect the wind downwardly as indicated by the hollow head arrows, thereby creating a lifting force on the load lifters 18 as indicated by the solid head arrows. This lifting force is transferred to the overall structure and helps to reduce the weight of the overall twin wind turbine system on bearings and other moving parts and thereby prolongs the life of the moving parts of the twin wind turbine system 2. In an alternative embodiment, the top load lifter 18 can be designed to be the wind direction vane 30 as well.

As also illustrated in FIG. 2, the cylindrical electrical room 20 rests on a solid foundation 21 typically constructed of concrete. Rotationally mounted on the cylindrical electrical room 20 is rotatable plate 22, which carries turbines 4 and 6, frame 16, wind shields 14 and rotates about twin turbine support shaft 27, which is housed in shaft cover 26. The twin wind turbines 4 and 6 rest on and rotate about respective turbine shaft covers 32, only one of which is visible in FIG. 2. An electrical generator or alternator 34 is located inside cylindrical electrical room 20 adjacent the support shaft 26. FIG. 2 also illustrates a servo motor 36 which is mounted at the base of windshield control shaft 24 and controls the wind exposure width of the pair of windshields 14.

FIG. 3 illustrates an enlargement of the section illustrated by circled portion A of FIG. 2. As seen in FIG. 3, support shaft 26 is connected to the top of cover 22 and the base of support frame 16. As also seen in FIG. 3, alternator (generator) 34 is connected by a system of sprockets and gears to respective turbine shafts 38 for the two wind turbines (one of which is visible in FIG. 3). The turbine shafts 38 are rotationally mounted inside turbine shaft covers 32. Turbine sprocket shafts 38 are connected to respective sprockets 40. The shafts 38 are rotationally mounted in respective pairs of ball bearing units 42. Located at the base of the respective shafts 38 are oil reservoirs 44 which keep all moving parts lubricated and minimizes friction. Visible sprocket 47 is connected by drive chain 46 to sprocket 47 and accompanying vertical shaft 49, which is rotationally mounted in a pair of ball bearings 50. Sprocket 47, via shaft 49, drives alternator (generator) 34. Electrical A/C power generated by the alternator 34 is transmitted for use through appropriate wiring 52. A disc 54 is mounted on shaft 49 and by brake 55 regulates or stops the speed of rotation. A similar set of shafts, sprockets, chains and bearings link the alternator (generator) 34 to the turbine sprocket shaft of the second wind turbine 6. FIG. 3 also illustrates the system of vertical and horizontal wheels 58 that rotatably mount the plate 22 on the electrical room 20.

Figure 4:
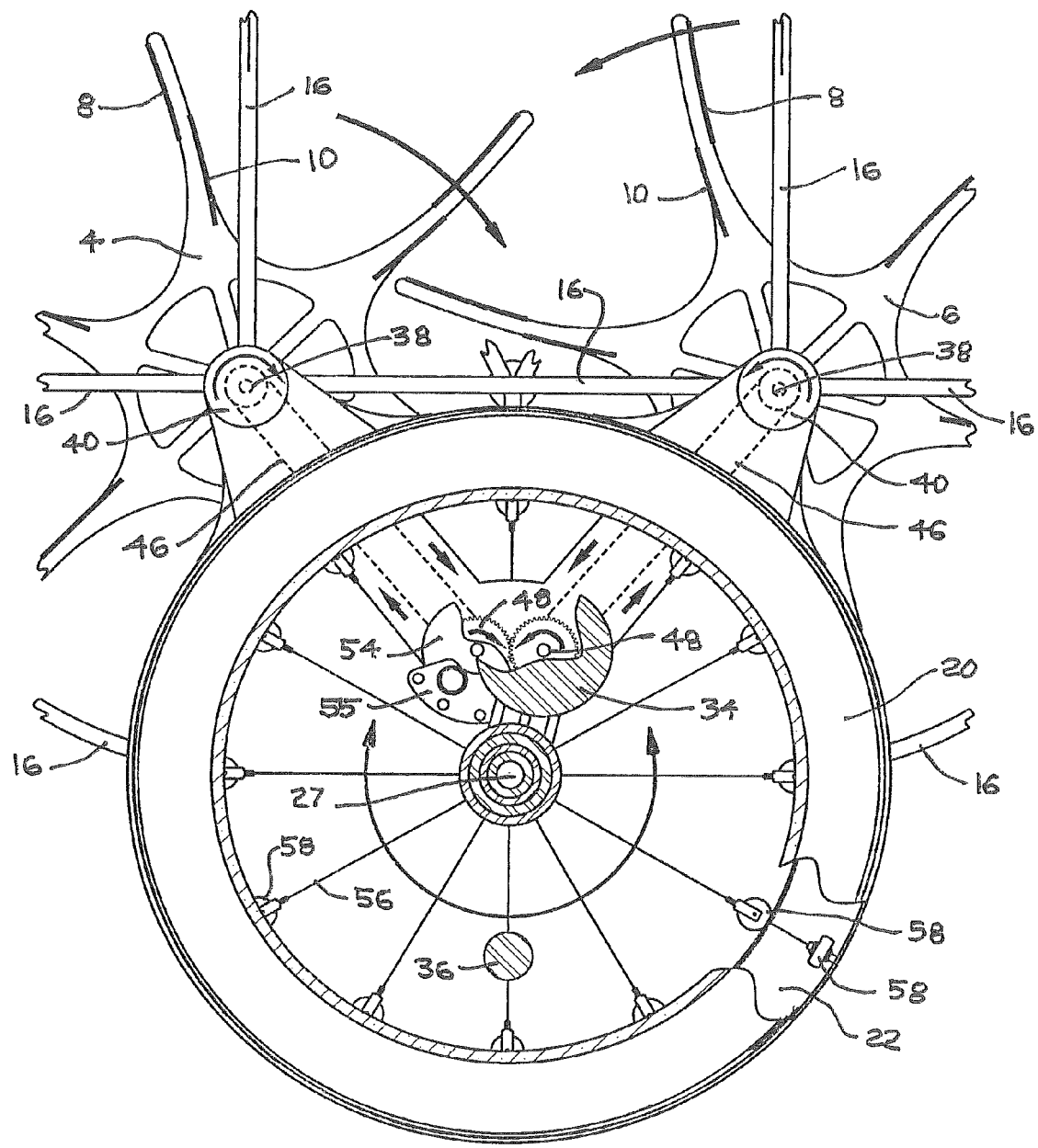
FIG. 4 illustrates a section view taken along section B-B of FIG. 2.

FIG. 4 illustrates a section view taken along section B-B of FIG. 2. As seen in FIG. 4, first wind turbine 4 and second wind turbine 6, with windward curved stationary vanes 8 and movable vanes 10 respectively, are housed in an overall support frame 16. Solid head curved arrows at the top region of the figure indicate the direction of rotation of the respective turbines 4 and 6. The respective sprocket shafts 38 rotate in unison with the respective wind turbines 4 and 6, and drive respective sprockets 40 and respective drive chains 46 as denoted by the directional solid head arrows in the central region of the figure. The chains 46 are respectively connected to a pair of sprockets 47 (not visible) which are connected to timing gears 48, which rotate in the direction indicated by the curved arrows on those gears. FIG. 4 also illustrates disc brake 54, 55 which is used to regulate or stop the speed of rotation of the sprockets 40 and 47.

FIG. 4 also illustrates rotatable plate 22, which rotates about cylindrical electric room 20. Rotation is accomplished by a radially extending series of reinforcing spokes 56 and horizontal and vertical rotation wheels 58, mounted at the ends of the respective spokes 56 (see also FIG. 3).

Figure 5:
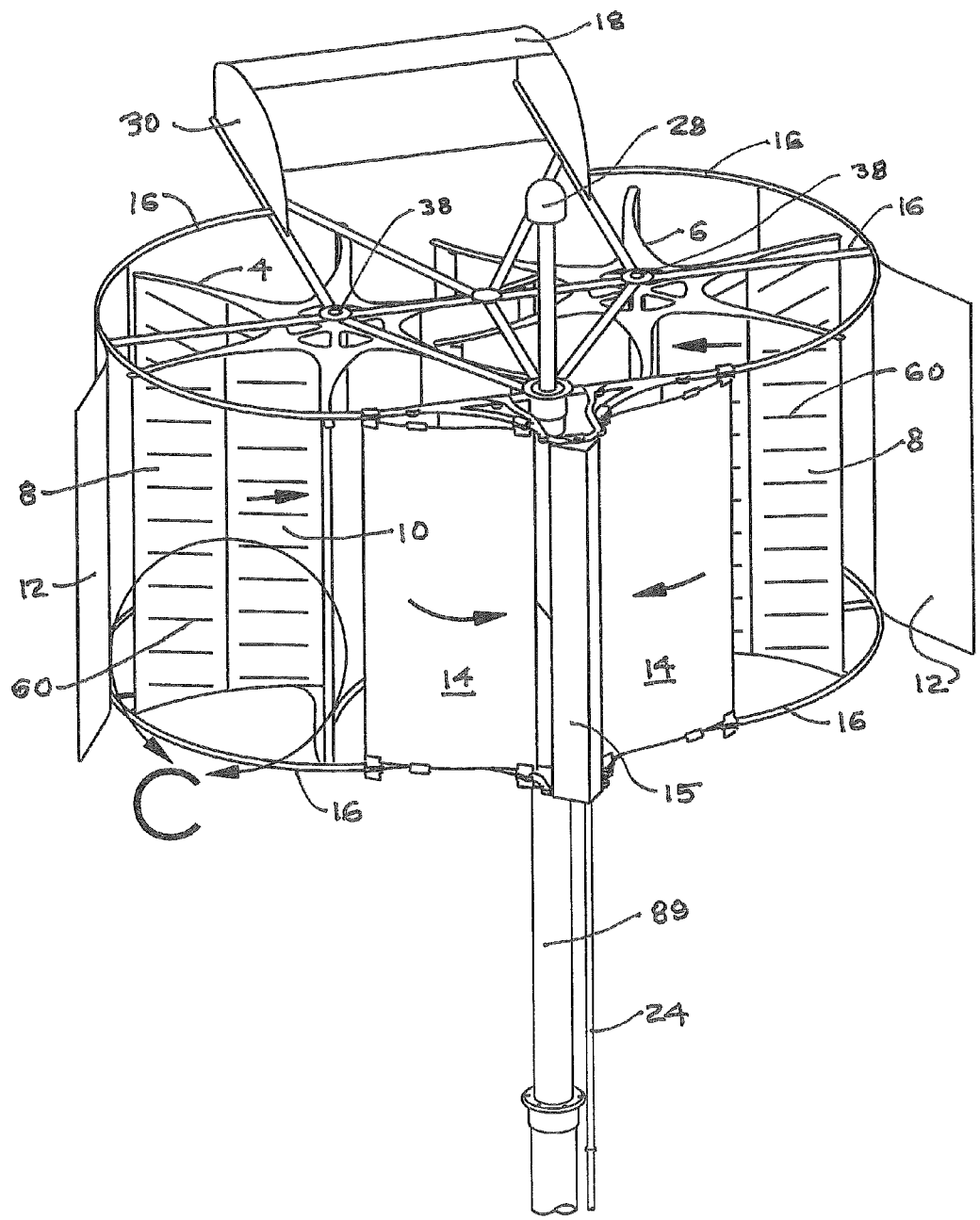
FIG. 5 illustrates an enlarged isometric view of the top section of the twin wind turbine power system illustrated in FIG. 1.

FIG. 5 illustrates an enlarged isometric view of the top section of the twin wind turbine power system illustrated in FIG. 1. As seen in FIG. 5, which for convenience shows only the topmost portion of the pair of wind turbines 4 and 6, the movable vanes 10, as indicated by the arrows, are fully extended in the direction of the axis of the respective turbines. Meanwhile, the movable portions of the windshields 14 are fully retracted, as indicated by the directional arrows. This configuration maximizes turbine blade exposure to the wind and is suitable for light to medium wind speeds.

Figure 6:
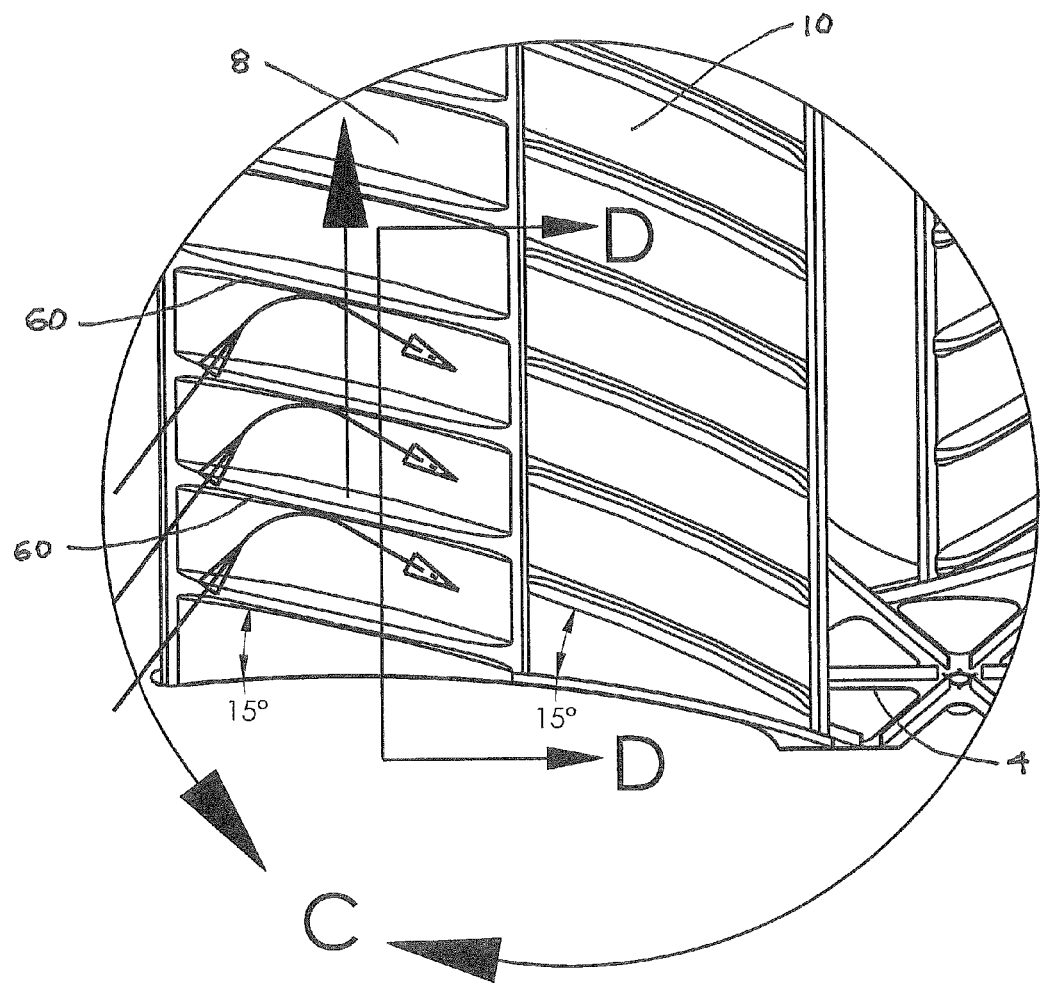
FIG. 6 illustrates an enlargement of the section illustrated by circled portion C of FIG. 5.

FIG. 6 illustrates an enlargement of the section illustrated by circled portion C of FIG. 5. As seen in FIG. 6, the wind, as indicated by the hollow head directional arrows, is caught in and directed by sloped wind deflection channels 60. This action results in an upward force being generated on the vane 8 as indicated by a solid headed straight arrow. This action provides a lifting force on the turbine and helps to reduce the weight of the turbine on the bearings and other moving parts. The wind deflection channels 60 are preferably angled at 15° to horizontal in order to provide the appropriate upward lifting force. In the configuration illustrated in FIG. 6, movable vane 10 is fully extended inwardly relative to stationary vane 8, a configuration which is suitable for light to medium winds.

Figure 7:
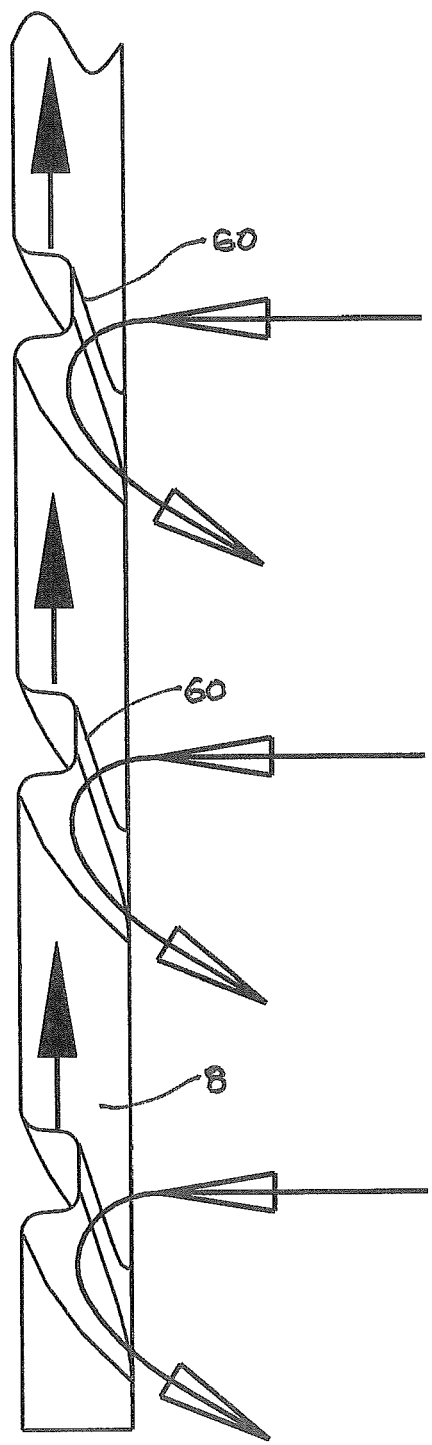
FIG. 7 illustrates a section view taken along section D-D of FIG. 6.

FIG. 7 illustrates a section view taken along section D-D of FIG. 6. This figure illustrates in detail the sloping stacked series of wind deflection channels 60 that are formed in the stationary vane 8. Wind deflection is indicated by the hollow-headed arrows, while the lifting force on the vane 8 is indicated by the vertical solid-headed arrows.

FIG. 8 illustrates a top view of the twin wind turbine power system. As seen in FIG. 8, the wind pattern is indicated by the hollow-headed arrows. The two outside wind catchers 12 catch peripheral wind which normally would pass by the exterior of the pair of wind turbines 4 and 6 and not generate power. The two wind catchers 12 direct the peripheral wind inwardly onto the respective outer regions of the blades of the two turbines 4 and 6. At the same time, central wind is deflected laterally by the pair of windshields 14 onto the respective vanes 8 and 10 of the respective first and second turbines 4 and 6. If the two windshields 14 and V-shaped wind deflector 15 were not present, then the central wind would impinge on the interior facing vanes of the respective turbines 4 and 6 and create a negative rotational effect. With the presence of the pair of windshields 14 and V-shaped wind deflector 15, the central wind is directed outwardly onto the outward portions of the respective vanes 8 and 10 of the respective turbines 4 and 6. Accordingly, the configuration illustrated in FIG. 8 ensures that the wind is divided and directed onto the outward portions of the respective vanes 8 and 10 of the rotating first and second wind turbines 4 and 6. FIG. 8 also illustrates wind direction vane 18, which ensures that the pair of wind turbines 4 and 6, windshields 14 and wind deflector 15 face windward at all times. FIG. 8 also illustrates how wind catchers 12 extend into respective curved wind retaining walls 13. These retaining walls 13 ensure that the wind cannot escape past the vanes 8 without delivering power to the vanes 8.

Figure 9:
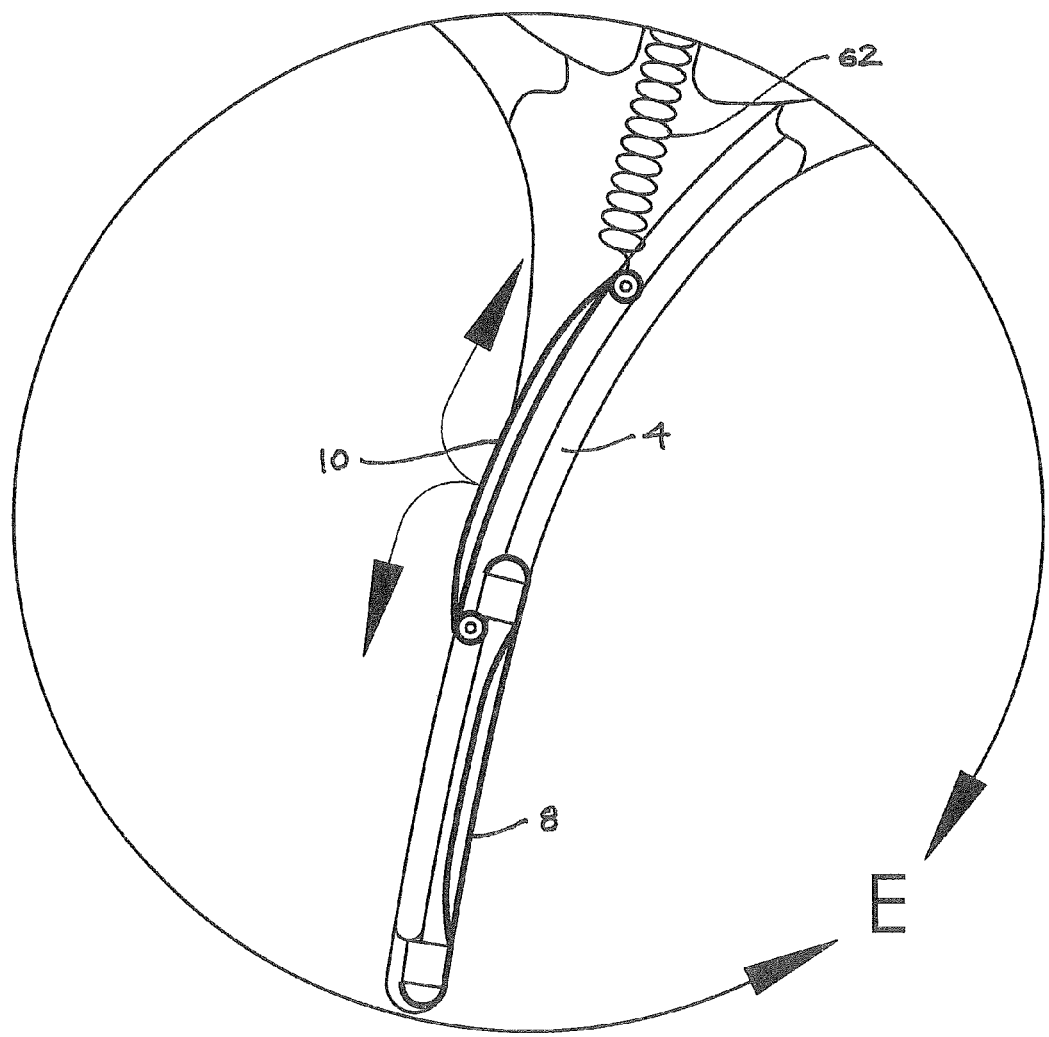
FIG. 9 illustrates an enlarged view of the section illustrated by circled portion E of FIG. 8.

FIG. 9 illustrates an enlarged view of the section illustrated by circled portion E of FIG. 8. As seen in FIG. 9, the stationary vane 8 remains in place at the outer radial region of the turbine, whereas movable vane 10 can move radially inwardly or outwardly as indicated by the solid-headed arrow. The movable vane 10 is connected to coil spring 62, which induces a return to position force on the vane 10 when retraction is required. The strength of the coil spring 62 is balanced with the centrifugal force created by the turbine 4 so that the faster the turbine 4 rotates, the more the movable vane 10 moves outwardly. Thus the area of the blade adjusts according to wind speed. The same system exists for turbine 6.

FIG. 10A illustrates an enlarged view of the section illustrated by circled portion F of FIG. 8. FIG. 10A shows that the pair of windshields are constructed in two parts, a pair of movable windshields 14 and a corresponding pair of stationary windshields 76. As seen in FIG. 10A, the respective positions of the pair of movable windshields 14 is controlled by a complementary set of first chain 64 and second chain 66. Cables can also be used. The two chain systems 64 and 66 travel around a dual set of pulley wheels or sprockets 70, 72 and 74. The movable windshields 14 can be retracted or extended in the directions of the respective arrows by means of double-wheel systems 78 and 80 which travel on frame 16. The degree of lateral extension of the windshields 14 is controlled by the positions of the pair of chains 64 and 66 that pass around double sprocket 68, which in turn is controlled by windshield control shaft 24 and servo motor 36 (see FIG. 3). A detailed view of the double sprocket 68 and the pair of chains 66 and 64 is illustrated in FIG. 10B, which is a section view taken along line G-G of FIG. 10A.

Figure 11:
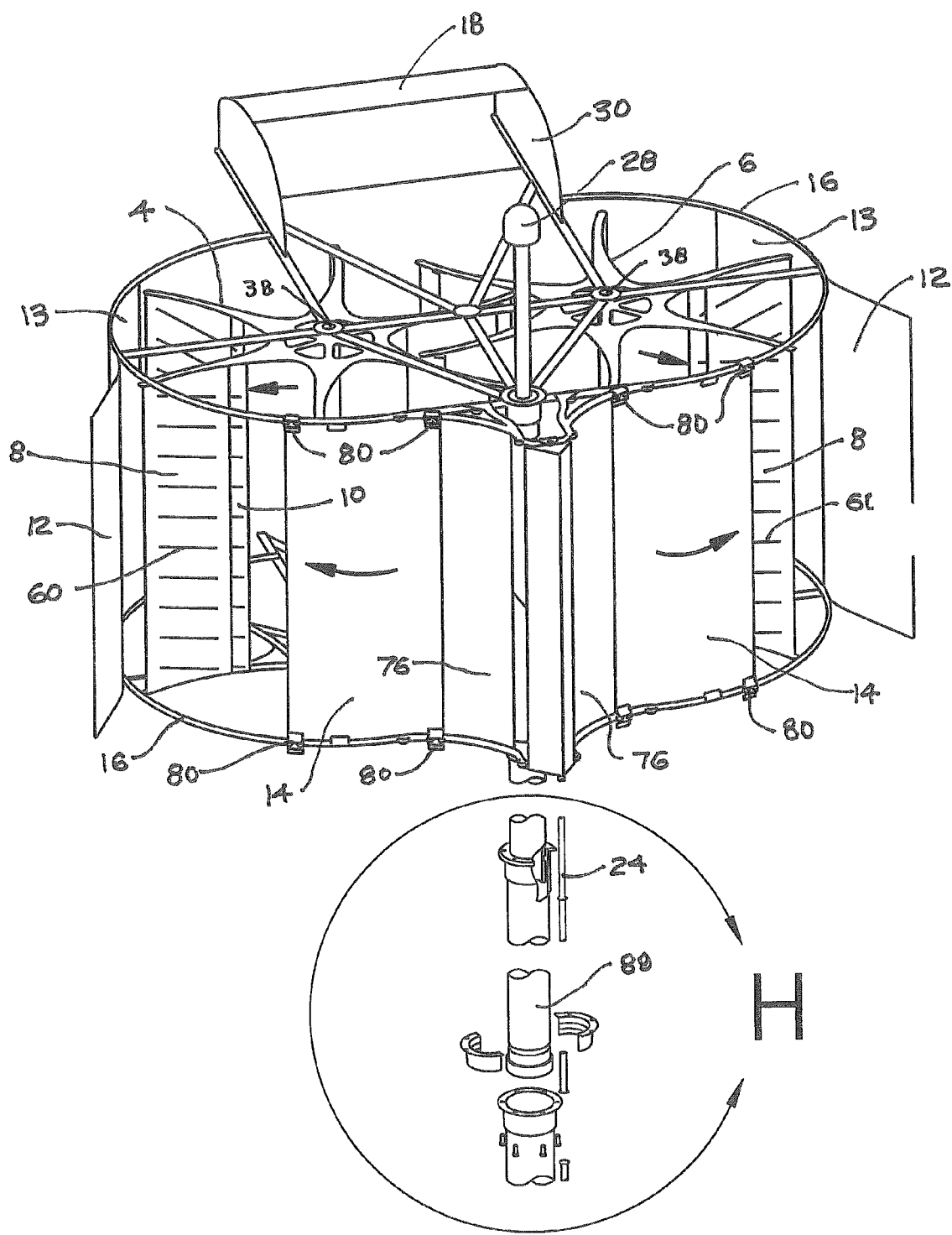
FIG. 11 illustrates an enlarged isometric view of the top section of the twin wind turbine power system illustrated in FIG. 1.

FIG. 11 illustrates an enlarged isometric view of the top section of the twin wind turbine power system. As seen in FIG. 11, in contrast to the configuration illustrated in FIG. 5 previously, the movable vanes 10 are shown in a retracted position while the movable windshields 14 are shown in an extended position. This is the configuration that is preferred when the twin wind turbines 4 and 6 are exposed to strong or heavy winds. This turbine blade area exposure to high winds is reduced and prevents the turbines 4 and 6 from rotating at undesirable speeds, which could tend to burn out alternator 34. FIG. 11 also illustrates double wheels 80 which are located at the top and bottom corners of the movable windshields 14 and enable them to travel laterally along the rims of the support frame 16.

Figure 12:
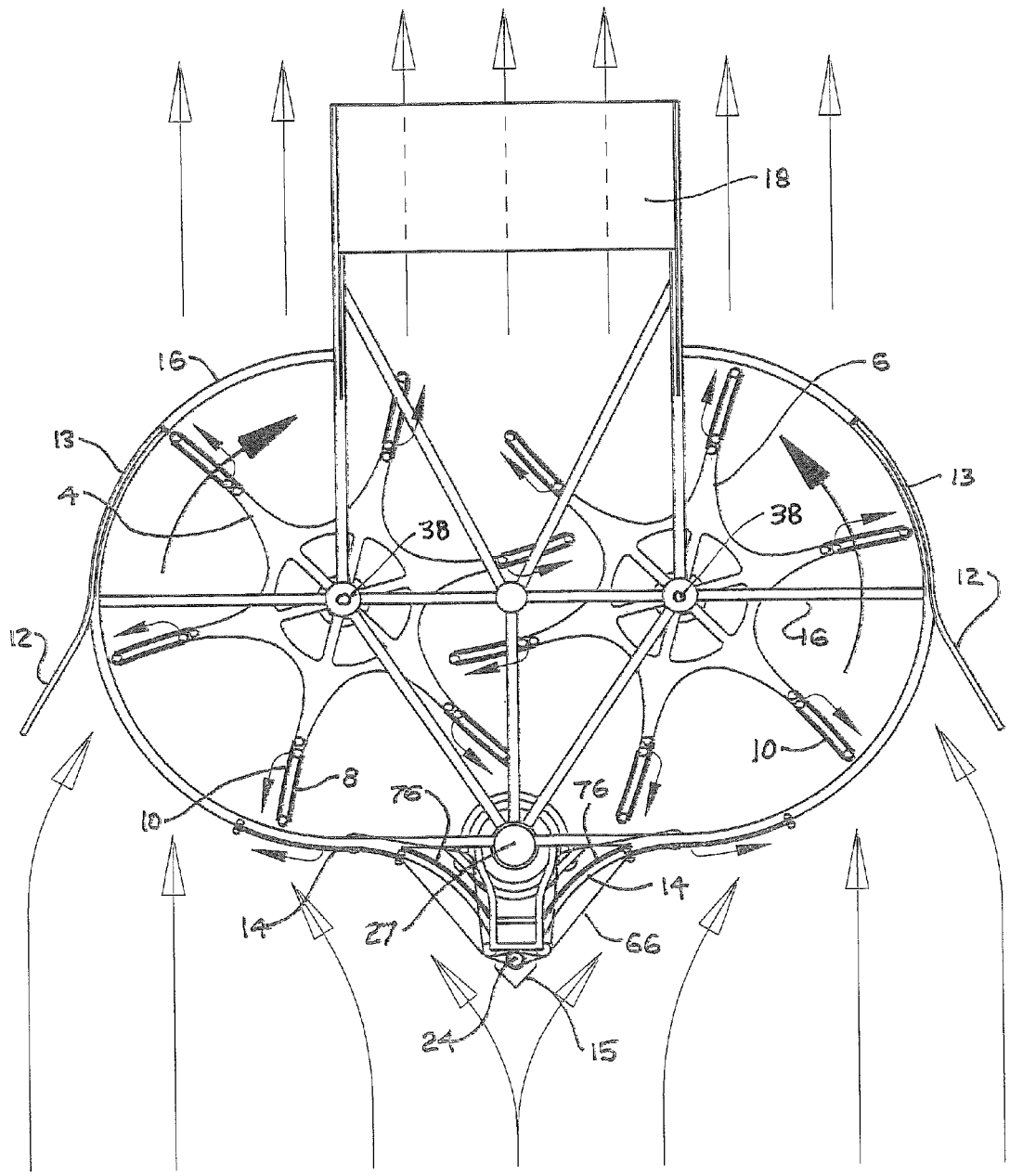
FIG. 12 illustrates a top view of the twin wind turbine power system with turbine blades retracted and wind deflectors extended to accommodate high wind speeds.

FIG. 12 illustrates a top view of the twin wind turbine power system with turbine blades retracted and wind deflectors extended to accommodate high wind speeds. As seen in FIG. 12, contrary to the configuration illustrated in FIG. 8, the movable vanes 10 are shown in retracted (outer) position and the movable windshields 14 are shown in extended position. In this manner, the turbines 4 and 6 are able to accommodate strong winds without being forced to rotate at unduly high speeds, which runs the risk of burning out the alternator 34.

Figure 13:
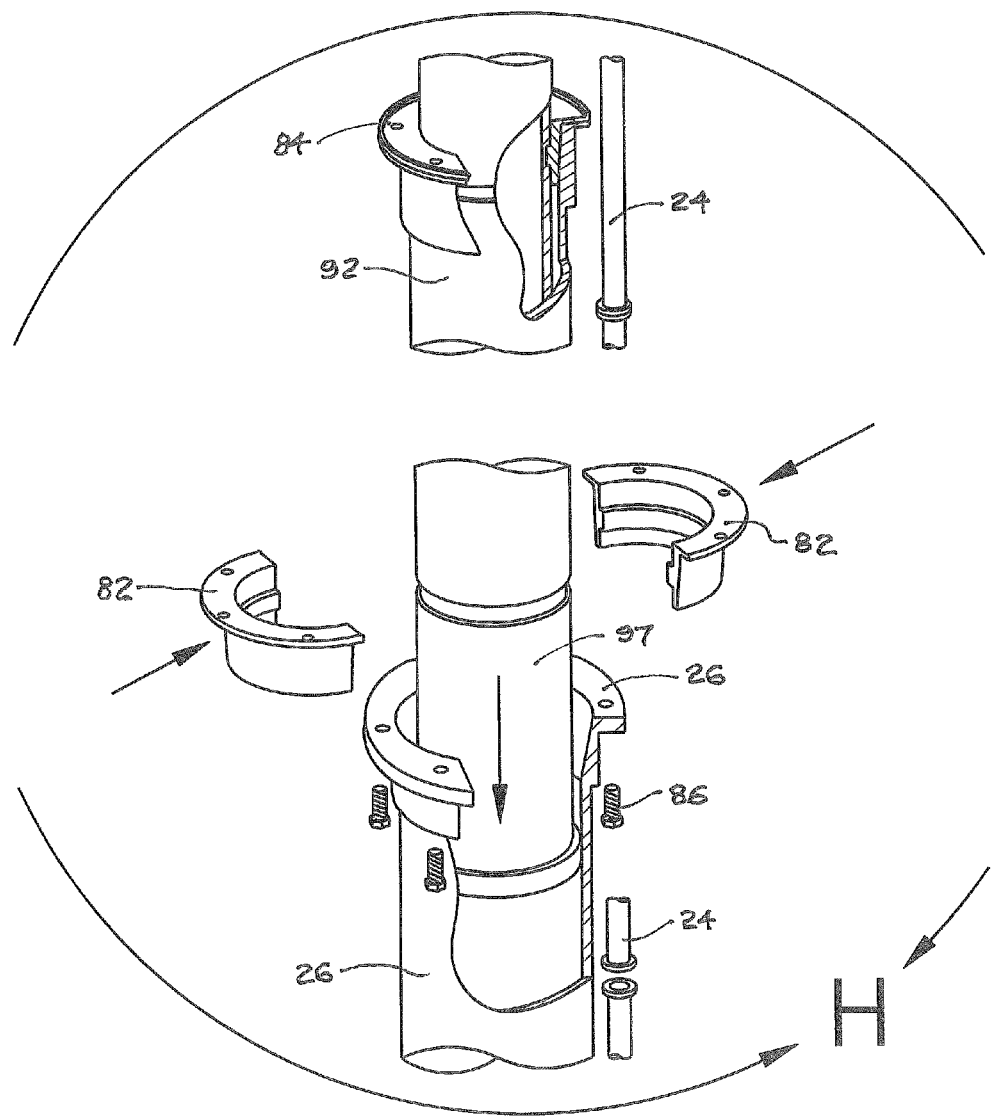
FIG. 13 illustrates a detail of the main post connector assembly of the section illustrated by circled portion H of FIG. 11.

FIG. 13 illustrates a detail of the main post connector assembly of the section illustrated by circled portion H of FIG. 11. Specifically, FIG. 13 illustrates how the sections of the twin turbine support shaft 26 are assembled together by means of sets of first and second collars 82 and 84 and securing bolts 86.

Figure 14:
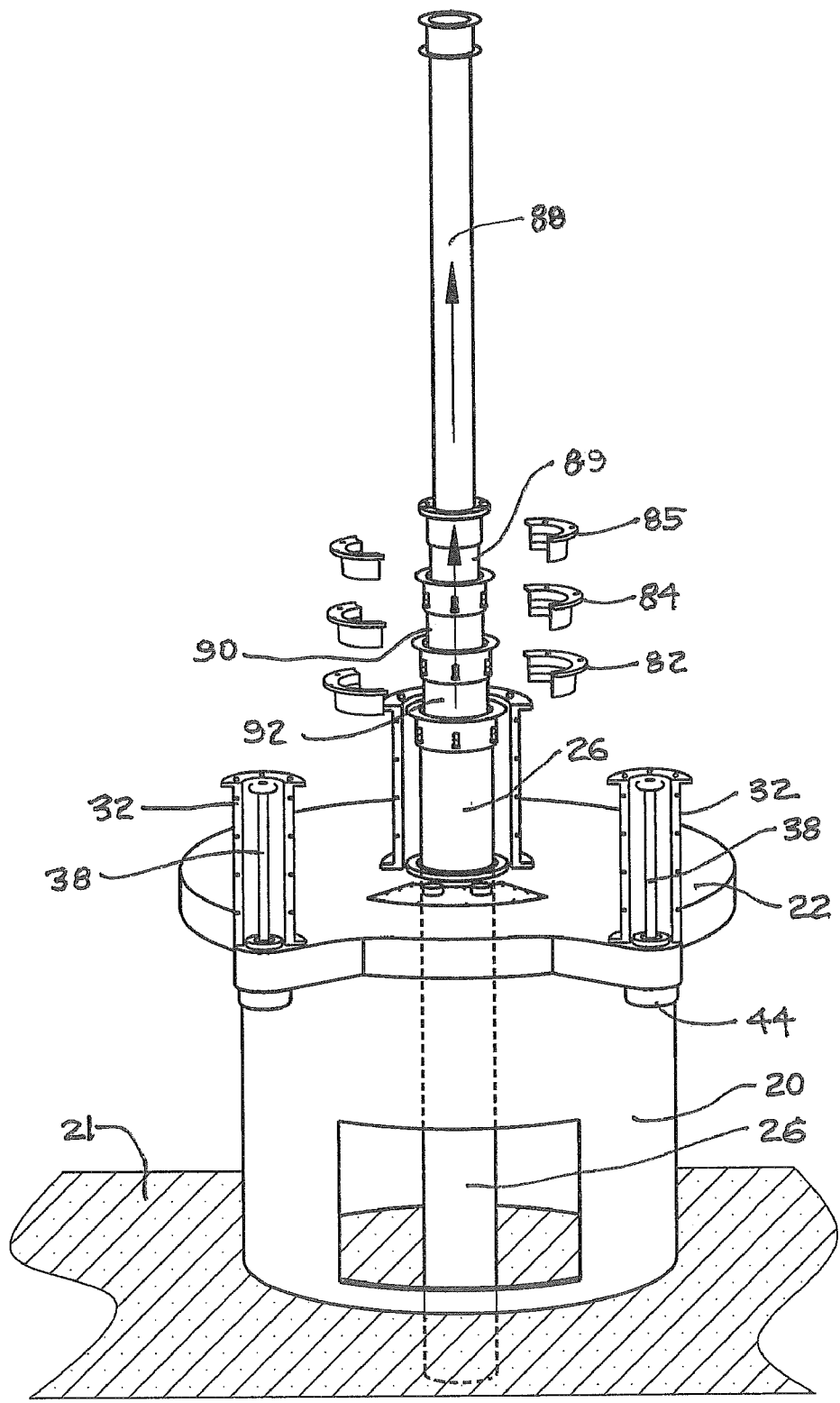
FIG. 14 illustrates a rear isometric view of the telescopic main post installation procedure.

FIG. 14 illustrates a rear isometric view of the telescopic main post installation procedure. As seen in FIG. 14, because of the telescoping shaft design 88, it is possible to erect the twin wind turbine system as illustrated in FIG. 1 in stages. When constructing the twin wind turbine system, the first shaft 88 is initially elevated and the twin wind turbines 4 and 6, including respective pairs of stationary vanes 8 and movable vanes 10, lateral windcatchers 12, windshields 14 and support frame 16, as well as wind direction vane 30, are installed in place on the shaft 88. Subsequently, shaft 89 is then raised into an upright extended position, which in turn raises shaft 88 and the supported structure vanes 8 and 10, windcatchers 12, and shafts 14 and support frame 16. Once shaft 89 is raised, the accompanying supporting structural turbine assembly is then secured to shaft 89. Successively, shafts 90 and 92 are then raised into position and the accompanying turbine components are secured to those shafts.

Figure 15:
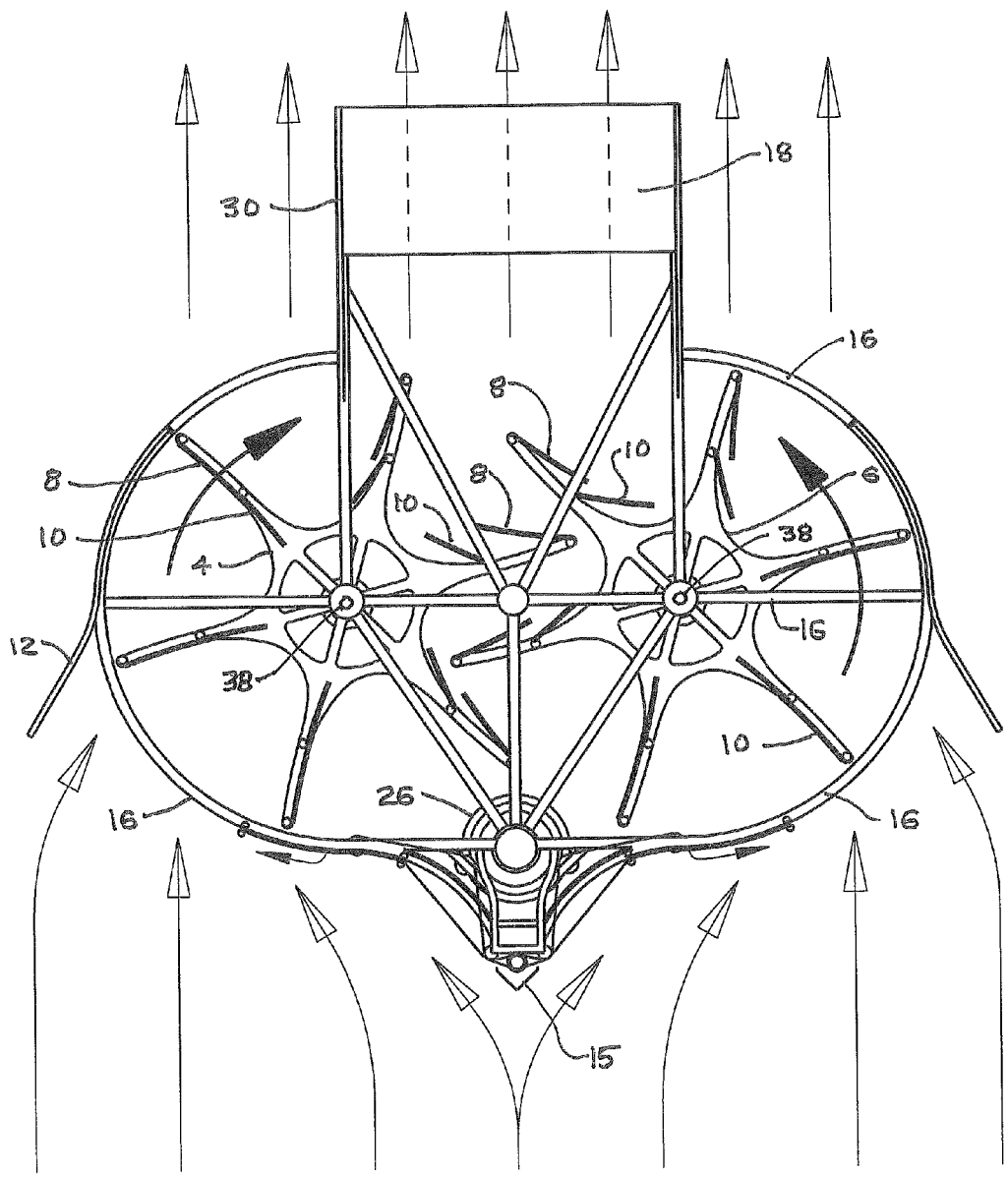
FIG. 15 illustrates a top view of an optional twin turbine power system with the fixed and movable vanes pivoted away from the turbine blades in the leeward position.

FIG. 15 illustrates a top view of an optional twin turbine power system with the fixed and movable vanes pivoted away from the turbine blades in the leeward position. As seen in FIG. 15, the stationary vanes 8 and movable vanes 10 are pivotally fixed to the respective turbines 4 and 6 at the leading edges. Thus, as illustrated in FIG. 15, the stationary vanes 8 and movable vanes 10 can pivot away from the respective turbine blades 4 and 6 when in the leeward position and enable the turbines to catch back draft wind currents. This enhances the overall wind catching power of the turbines 4 and 6.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A twin wind turbine electrical power generating system comprising:
   (a) a first rotatable wind turbine with vertical radially extending blades around its axis;
   (b) a second rotatable wind turbine deployed parallel to the first turbine with vertical radially extending blades around its axis;
   (c) a vertical windshield positioned windwardly between the first and second wind turbines;
   (d) a wind direction member associated with the first and second wind turbines and directing the first and second wind turbines and windshield to face windward;
   (e) a rotational support upon which items (a), (b), (c) and (d) are mounted;
   (f) an alternator connected to the first and second wind turbines and generating electricity as the first and second wind turbines rotate,
   wherein the widths of the blades of the first and second wind turbines can be narrowed or widened according to variable wind speeds,
   wherein the turbine blades are formed of first vanes fixed to the rotatable wind turbine and second vanes movable relative to the first vanes, which cooperate together to increase or decrease the effective widths of the turbine blades, and
   wherein the second vanes are connected to springs and the position of the second vanes is determined by the force exerted by the springs to resist centrifugal force generated by the rotating wind turbines.

2. A system as claimed in claim 1 wherein the width of the windshield can be narrowed or widened according to variable wind speeds.

3. A system as claimed in claim 2 wherein the width of the windshield is controlled by a connecting shaft and servomotor.

4. A system as claimed in claim 3 wherein the windshield is constructed of stationary and movable sections.

5. A system as claimed in claim 4 wherein the movable section of the windshield is controlled by a system of sprockets and chains controlled by the servomotor.

6. A system as claimed in claim 5 including a wind deflector on the windward side of the windshield.

7. A system as claimed in claim 1 wherein the support for the first and second wind turbines comprises a rotational shaft and a rotational member which rotationally rests on a stationary chamber which houses the alternator and associated electrical wiring.

8. A system as claimed in claim 7 wherein the rotational shaft for the first and second wind turbine is a telescoping shaft.

9. A system as claimed in claim 8 wherein the first and second wind turbines are constructed of modular sections which can be assembled separately.

10. A system as claimed in claim 7 wherein the chamber is cylindrical in construction and the rotational member is a plate which is rotationally mounted on the top of the cylindrical chamber by a series of wheels.

11. A system as claimed in claim 1 wherein the axes of the first and second wind turbines are vertically disposed axles which are connected separately by pulley, timing gears, sprocket and chain combinations to the alternator.

12. A system as claimed in claim 11 including a brake which upon command applies a braking force to the pulley sprocket and chain system.

13. A system as claimed in claim 12 wherein the brake is a disk brake.

14. A system as claimed in claim 1 wherein the first and second wind turbines are connected to the alternator by a system of sprockets, timing gears and connecting chains.

15. A system as claimed in claim 1 including wind directional vanes located on each lateral exterior side of the first and second wind turbines.

16. A system as claimed in claim 1 wherein the first and second vanes on the windward side have a series of downwardly angled parallel grooves therein which deflect the wind downwardly, thereby imparting a lifting force on the first and second wind turbines.

17. A system as claimed in claim 1 wherein the leeward side of the system has one or more downwardly disposed wind vanes which deflect leeward wind downwardly and thereby imparts a lifting force on the first and second wind turbines.

18. A system as claimed in claim 1 wherein the first and second wind turbines and the windshield are housed in a supporting frame.

19. A system as claimed in claim 1 wherein the ends of the blades of the first and second turbines intersect with one another to reduce overall width of the twin turbine system and the respective positions of the first and second wind turbines are controlled by timing gears.

20. A system as claimed in claim 1 including at least one deflector which directs wind downwardly and reduces the weight of the turbine system.

* * * * *